United States Patent
Wei

(10) Patent No.: US 7,389,925 B2
(45) Date of Patent: Jun. 24, 2008

(54) SCANNER WITH LOCKING MODULE FORMED BY MAGNETIC COMPONENT

(75) Inventor: Chih-Hsien Wei, Taipei (TW)

(73) Assignee: Lite-On Technology Corp., Neihu, Taipei (TW)

( * ) Notice: Subject to any disclaimer, the term of this patent is extended or adjusted under 35 U.S.C. 154(b) by 474 days.

(21) Appl. No.: 10/908,980

(22) Filed: Jun. 2, 2005

(65) Prior Publication Data

US 2006/0170992 A1   Aug. 3, 2006

(30) Foreign Application Priority Data

Jan. 28, 2005   (TW)   .............................. 94102806 A

(51) Int. Cl.
  G06K 7/10   (2006.01)
  G06K 7/14   (2006.01)
  H04N 1/04   (2006.01)
  G03G 15/00  (2006.01)

(52) U.S. Cl. ........................ 235/454; 358/497; 399/211

(58) Field of Classification Search ................. 235/470; 358/497; 250/208.1; 399/211
See application file for complete search history.

(56) References Cited

U.S. PATENT DOCUMENTS

| | | | |
|---|---|---|---|
| 5,986,774 A * | 11/1999 | Han ........................... | 358/497 |
| 2002/0121590 A1 * | 9/2002 | Yoshida et al. ........... | 250/208.1 |
| 2004/0100668 A1 * | 5/2004 | Yoshida ...................... | 358/494 |
| 2006/0055396 A1 * | 3/2006 | Georgeson et al. .......... | 324/202 |

FOREIGN PATENT DOCUMENTS

| | | |
|---|---|---|
| CN | 1255012 A | 5/2000 |
| CN | 2377622 Y | 5/2000 |

* cited by examiner

*Primary Examiner*—Jared J Fureman
(74) *Attorney, Agent, or Firm*—Winston Hsu

(57) ABSTRACT

A scanner includes a first shaft, a second shaft, a photoelectric sensor for scanning a medium to produce an image, a movable carriage positioned on the first shaft for carrying the photoelectric sensor, a movable light source module positioned on the second shaft for generating a light beam for the medium, a driving module coupled to the carriage for driving the carriage to move a first offset along the first shaft, and a locking module coupled to the light source module and the carriage. As the carriage moves with the first offset, the carriage ensures the light source module moves a second offset along the second shaft through the locking module.

3 Claims, 3 Drawing Sheets

SCANNER WITH LOCKING MODULE FORMED BY MAGNETIC COMPONENT

BACKGROUND OF INVENTION

1. Field of the Invention

The present invention relates to a scanner, and more specifically, to a scanner comprising a locking module for moving a light source with a carriage simultaneously.

2. Description of the Prior Art

In general, scanners on the market are divided into three groups according to the media they scan, positive scanners, negative scanners (for photo films and projective films etc.), and scanners which support both positive and negative media. As a scanner scans a negative image, there are two types of light source modules can be selected; the first type is immovable and has a large lighting area, the second type is movable and has a small lighting area. For the immovable light source module, when the scanner scans a negative image, a uniform light source is provided for the whole region on the scanning platform. This ensures that the light passes through the transparent region of the negative image and is received by photoelectric sensors set on a carriage positioned below the scanning platform, but the light cannot pass through the opaque region of the negative image. Next, according to the received light, the photoelectric sensor produces an image corresponding to the negative image. Because this method requires a brighter and more uniform light source, the cost is high.

For the movable light source module, the negative image is divided into a plurality of small regions when the scanner is scanning. Next, a driving module drives the light source module and the carriage to move simultaneously for utilizing photoelectric sensors set on the carriage to scan these small regions continuously. Finally, all scanning images scanned at all small regions are combined to form a fully scanned image. It is unnecessary to provide a light source for lighting up all scanning regions, therefore resulting in a lower cost than the immovable light source module, but this method requires additional transmissions (like gears or belts) to form the driving module to drive the light source module. As mentioned above, the driving module has to drive the light source module and the carriage simultaneously for scanning completely.

In conclusion, taking the cost factor into consideration, traditional scanners usually select the second type of light source module discussed above for scanning media, but the disadvantage is that they require additional mechanical apparatus for driving the light source module to move with the carriage simultaneously.

SUMMARY OF INVENTION

It is therefore one of the objectives of the claimed invention to provide a scanner with a locking module, where the scanner utilizes the locking module to move a light source module and a carriage simultaneously to solve the above-mentioned problems.

According to the claimed invention, a scanner with a locking module is disclosed. The scanner includes a first shaft, a second shaft, a photoelectric sensor for scanning a medium to produce an image, a carriage movably positioned on the first shaft for carrying the photoelectric sensor, a light source module movably positioned on the second shaft for generating a light beam for the medium, a driving module coupled to the carriage for driving the carriage to move a first offset along the first shaft, and a locking module coupled to the light source module and the carriage, where when the carriage moves with the first offset, the carriage ensures the light source module moves a second offset along the second shaft through the locking module.

A scanner with a locking module is disclosed in the present invention. Because the locking module is connected to the light source module and the carriage, when the driving module drives the carriage to move, the locking module moves the light source module at the same time. It is therefore only necessary for the driving module to drive the carriage to move to ensure the light source module moves simultaneously with the carriage, and no extra transmissions (like gears or belts) are needed. Compared with traditional scanners, the scanner disclosed in the present invention reduces the complexity of the transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
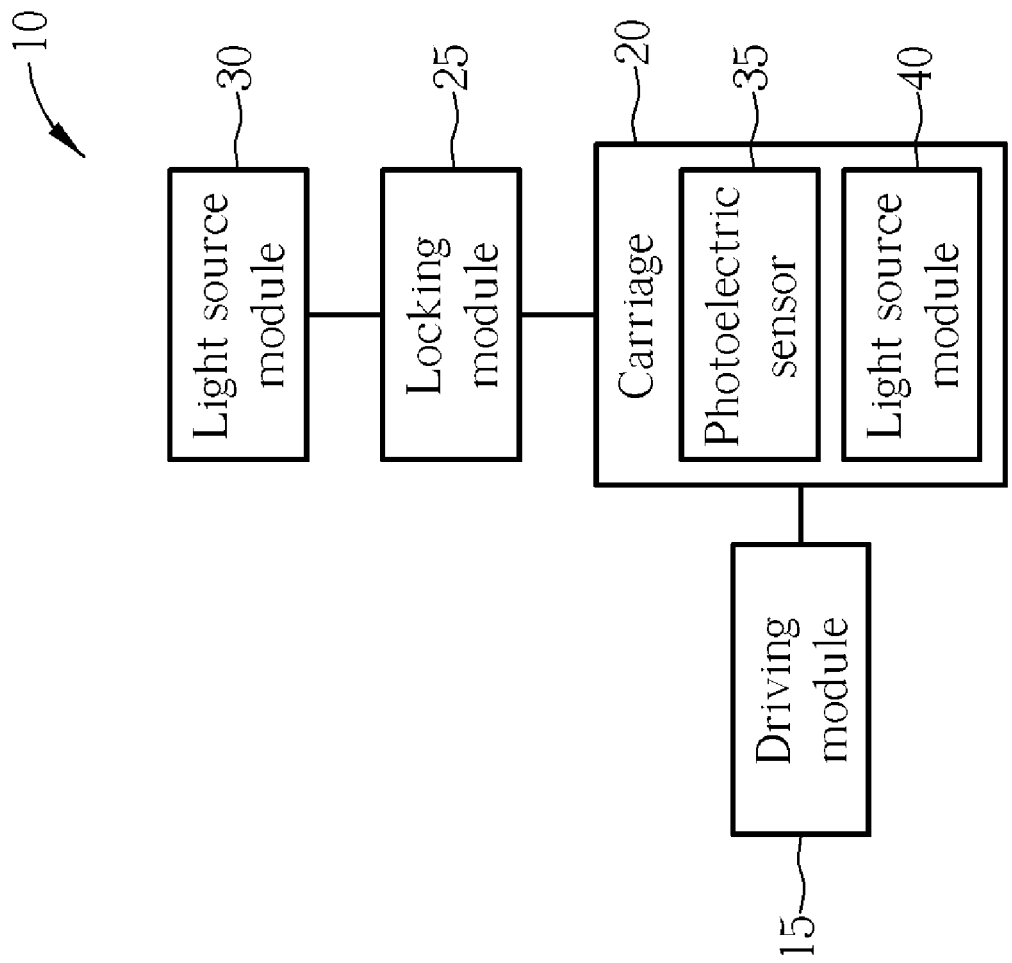
FIG. 1 is a block diagram of a scanner according to a first embodiment of the present invention.

Please refer to FIG. 1. FIG. 1 is a block diagram of a scanner 10 according to a first embodiment of the present invention. In the following disclosure, only components of the scanner 10 that are relevant to the present invention are illustrated and described, for the purposes of clarity and simplicity. As FIG. 1 shows, the scanner 10 includes a carriage 20, a driving module 15, a locking module 25, and a light source module 30, wherein a photoelectric sensor 35 (such as a CCD) and another light source module 40 are positioned on the carriage 20. A function of the scanner 10 is scanning a medium such as a positive image or a negative image. The scanner 10 in this embodiment supports both operations of positive image scanning and negative image scanning. Assuming the medium is a negative image, the scanner 10 divides the negative image into a plurality of small regions for scanning. At the same time, the light module 30 outputs a light beam on the negative image and the light beam passes through the negative image and is received by the photoelectric sensor 35 positioned on the carriage 20 for producing a scanning image. When a small region is scanned completely, the driving module 15 (such as a motor) drives the carriage 20 to move to a next small region for scanning. If the locking module 25 is in a locking mode to lock the carriage 20 (structure of the locking module 25 will be described later), then the locking module 25 will move with the carriage 20. In this embodiment, as the locking module 25 and the light source module 30 move together, the light source module 30 moves simultaneously with the carriage 20 to a next small region for scanning via the aid of the locking module 25. Please note that, if the medium is a positive image, because of the opaque characteristics of the positive image, the scanner 10 will turn off the light source module 30 and set the locking module 25 to an unlocked mode to unlock the carriage 20 (structure of the locking module 25 will be described later). The scanner 10 changes the light source from the light source module 30 to the light source module 40 positioned on the carriage 20 for providing light. Furthermore, the photoelectric sensor 35 receives a light beam reflected by the positive image to produce a scanning image.

Figure 2:
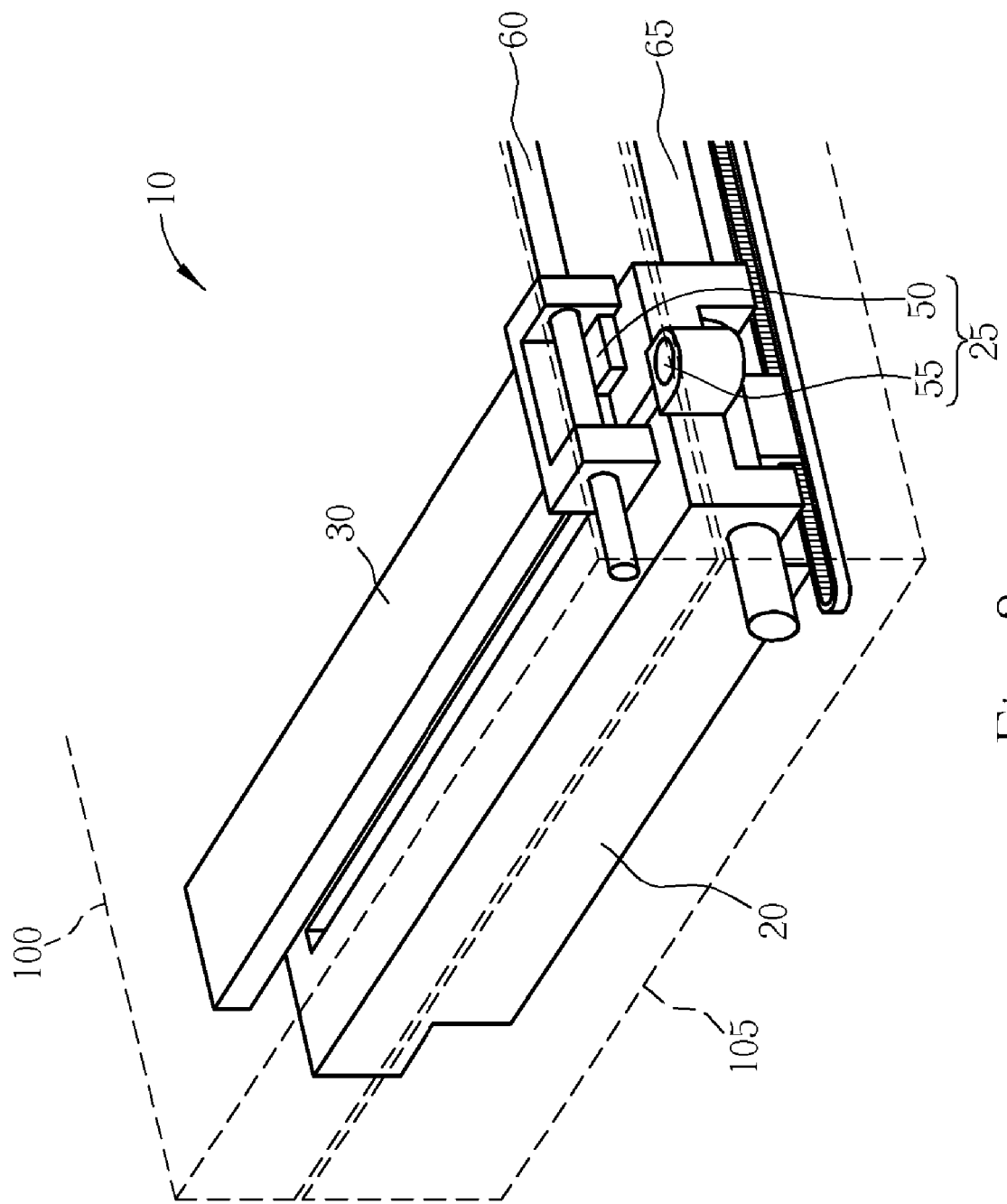
FIG. 2 is a diagram of the scanner described in FIG. 1.

Please refer to FIG. 1 and FIG. 2. FIG. 2 is a diagram of the scanner 10 described in FIG. 1. As FIG. 2 shows, the carriage 20 is positioned on a shaft 65, and the driving module 15 (not illustrated in FIG. 2) drives the carriage 20 to move along the shaft 65. In the same way, the light source module 30 is positioned on another shaft 60, and moves along the shaft 60. Besides this, a magnetic component such as a permanent magnet 55 is set near the shaft 65 on the carriage 20, and a metal component 50 (like an iron sheet) corresponding to the position of the permanent magnet 55 is set near the shaft 60 on the light source module 30. In this embodiment, the permanent magnet 55 and the metal component 50 form the locking module 25, wherein one end (the permanent magnet 55) of the locking module 25 is fixed on the carriage 20 and the other end (the metal component 50) of the locking module 25 is fixed on the light source module 30. Because the permanent magnet 55 generates a magnetic force to attract the metal component 50, the locking module 25 is in a locking mode to lock the carriage 20 and accomplish the goal of moving the light source module 30 with the carriage 20. As FIG. 2 shows, the scanner 10 includes an upper housing 100 and a lower housing 105, where the light source module 30, the shaft 60 and the metal component 50 are positioned in the upper housing 100, and the carriage 20, the shaft 65, the permanent magnet 55, and the driving module 15 (not illustrated in FIG. 2) are positioned in the lower housing 105. The operation principle of the scanner 10 is similar to the traditional scanner discussed above; when the scanner 10 scans a medium, the scanner 10 divides the medium (such as a negative image) into a plurality of small regions for scanning. As the driving module 15 drives the carriage 20 to shift a first offset, at the same time the light source module 30 moves a second offset via the aid of the locking module 25. In this embodiment, the second offset is equal to the first offset, that is to say the light source module 30 moves with the carriage 20 simultaneously. Please note that, in this embodiment, the locking module 25 consists of the permanent magnet 55 positioned on the carriage 20 and the metal component 50 positioned on the light source module 30, but, as will be understood by those skilled in the art, other configurations can easily be applied to form the locking module 25 to complete a magnetic connection. For example, the position of the permanent magnet 55 and the metal component 50 can be swapped; in other words, setting the metal component 50 on the carriage 20 and setting the permanent magnet 55 on the light source module 30. Another example is replacing the metal component 50 with a permanent magnet and changing all permanent magnets discussed above to electromagnets, etc. The electromagnet is electrified to generate a magnetic force when the carriage 20 moves, causing two ends of the locking module 25 to attract each other to lock the carriage 20. Please note that permanent magnets, metal components, and electromagnets can be integrated together in many configurations to achieve the locking module 25 in the scanner 10 of the present invention, and all configurations are covered by the claimed invention.

Figure 3:
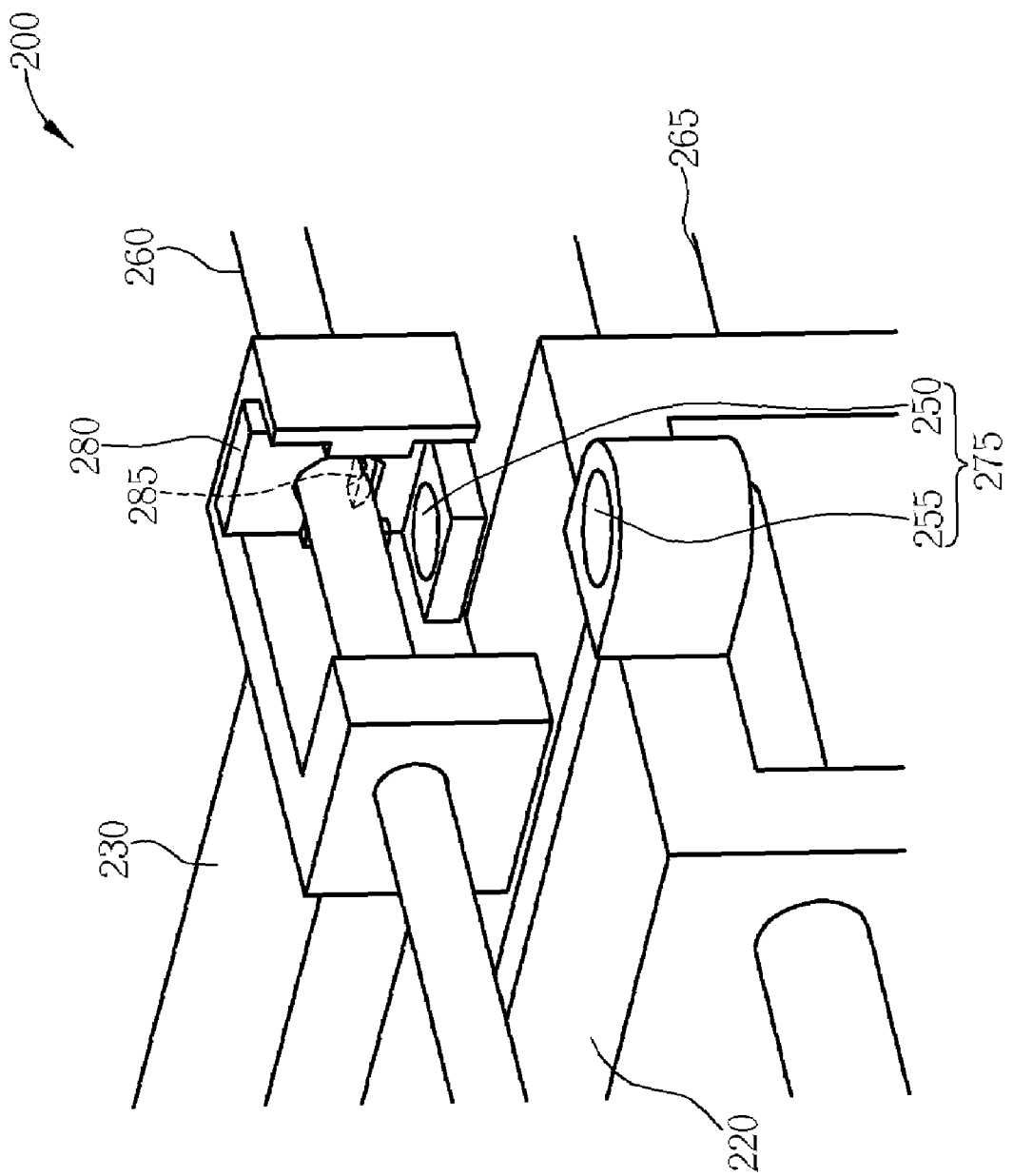
FIG. 3 is a diagram of the scanner according to a second embodiment of the present invention.

Please refer to FIG. 2 and FIG. 3. FIG. 3 is a diagram of the scanner 200 according to a second embodiment of the present invention. In the following disclosure, for the sake of simplicity, FIG. 3 only illustrates a carriage 220, a light source module 230, two shafts 260, 265 and a locking module 275, wherein one end of the locking module 275 near the carriage 220 is an electromagnet 255, and the other end near the light source module 230 is a permanent magnet 250. Because the structure of the scanner 200 shown in FIG. 3 is similar to the scanner 10 shown in FIG. 2, and devices with the same name have the same functions and operations, further description is omitted for brevity. Furthermore, in the embodiment, the light source module 230 includes a tenon 280 connected to the permanent magnet 250 and the shaft 260 includes a groove 285. Because the electromagnet 255 is non-magnetic without the electrical current, the scanner 200 utilizes the tenon 280 and the groove 285 to fix the light source module 230 on the shaft 260 when the scanner 200 is turned off or in standby mode. For example, when the light source module 230 is at an initial position, the electromagnet 255 is turned off, and the permanent magnet 250 attracts the shaft 260 to lodge the tenon 280 in the groove 285 for preventing the light source module 230 from moving along the shaft 260. When a driving module (not illustrated) drives the carriage 220 to move, the scanner 200 provides an electrical current for the electromagnet 255, therefore the electromagnet 255 attracts the permanent magnet 250 to take the tenon 280 away from the groove 285 in order to allow the light source module 230 to move simultaneously with the carriage 220 along the shaft 260. Those skilled in the art will realize that the light source module 230 can be controlled to move with the carriage 220 simultaneously by other methods via controlling whether the tenon 280 lodges into the groove 285 or not. For example, it is possible to replace the permanent magnet 250 with a metal component (such as an iron sheet), and additionally utilize a spring to provide an elastic force for making the initial position of the tenon 280 being in the groove 285 to prevent the light source module 230 from moving along the shaft 260. As the carriage 220 starts moving, the scanner 200 provides the electromagnet 255 with an electrical current and the electromagnet 255 attracts the metal component to take the tenon 280 away from the groove 285 for allowing the light source module 230 to move simultaneously with the carriage 220 along the shaft 260. The above-mentioned configurations are all covered by the present invention.

Comparing with related arts, the scanner 10 disclosed in the present invention provides a mechanical structure to connect the light source module 30 and the carriage 20 via a locking module 25. This ensures the light source module 30 and the carriage 20 move simultaneously, resulting in simplicity of transmissions in the scanner 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scanner, comprising:
   a first shaft;
   a second shaft;
   a photoelectric sensor for scanning a medium to produce an image;
   a carriage movably positioned on the first shaft for carrying the photoelectric sensor;
   a light source module movably positioned on the second shaft for generating a light beam for the medium;
   a driving module coupled to the carriage for driving the carriage to move a first offset along the first shaft; and
   a locking module coupled to the light source module and the carriage, the carriage ensures the light source module moves a second offset along the second shaft through the locking module when the carriage moves with the first offset, the locking module comprising:
   a permanent magnet positioned fixedly on the light source module; and
   an electromagnet positioned fixedly on the carriage;

wherein the second shaft includes a groove; the light source module includes a tenon connected to the permanent magnet; when the light source module is at an initial position, if the electric current supported to the electromagnet is turned off, then the permanent magnet attracts the second shaft and lodges the tenon in the groove for preventing the light source module from moving along the second shaft, and if the electric current supported to the electromagnet is turned on, then the electromagnet attracts the permanent magnet and takes the tenon away from the groove for allowing the light source module to move along the second shaft.

2. The scanner of claim 1, wherein the first offset is equal to the second offset.

3. The scanner of claim 1 further comprising an upper housing and a lower housing, wherein the first shaft is positioned in the lower housing and the second shaft is positioned in the upper housing.

* * * * *